United States Patent [19]

Romano

[11] 4,193,108

[45] Mar. 11, 1980

[54] APPARATUS FOR SECURELY FASTENING A CIRCUIT BOARD TO A CIRCUIT BOARD EDGE CONNECTOR

[75] Inventor: John V. Romano, San Jose, Calif.

[73] Assignee: Atari, Inc., Sunnyvale, Calif.

[21] Appl. No.: 930,470

[22] Filed: Aug. 2, 1978

[51] Int. Cl.[2] .............................................. H02B 1/02

[52] U.S. Cl. .................................... 361/399; 361/413; 339/176 MP

[58] Field of Search ............... 361/415, 399, 413, 403, 361/417, 418; 339/176 MP, 176 MF, 125 R, 128, 17 LC, 91 R; 174/138 R, 138 G, 138 D; 85/80, 81; 248/73, 74 A, 507, 500; 24/73 AS, 73 D, 73 P, 73 PF, 73 PM

[56] References Cited

U.S. PATENT DOCUMENTS

| | | | |
|---|---|---|---|
| 3,022,973 | 2/1962 | Morrow et al. | 174/138 R |
| 3,650,173 | 3/1972 | Mathe | 85/81 |
| 4,134,632 | 1/1979 | Lindberg | 361/399 |

FOREIGN PATENT DOCUMENTS

| | | | |
|---|---|---|---|
| 82439 | 10/1962 | France | 24/73 D |

*Primary Examiner*—David Smith, Jr.
*Attorney, Agent, or Firm*—Townsend and Townsend

[57] ABSTRACT

A pair of fastening devices for rigidly securing a circuit board having electrically conductive fingers extending from the edge to an edge connector having slots which engage the fingers and provide electrical coupling of the circuit board to external devices or circuits. Each of the devices includes a fastening member which is first loosely attached to the circuit board by a plurality of flexible ears projecting from a planar portion of the member and inserted through an opening in the circuit board proximate the edge. A drive pin is moved through an aperture in the planar portion to spread apart the flexible ears within the opening and rigidly secure the previously loosely attached member to the circuit board. An end portion on each fastening member overlaps the edge of the circuit board and includes means for retaining the edge connector to the fastening member.

25 Claims, 5 Drawing Figures

APPARATUS FOR SECURELY FASTENING A CIRCUIT BOARD TO A CIRCUIT BOARD EDGE CONNECTOR

BACKGROUND OF THE INVENTION

This invention relates to a fastening device which provides secure, vibration-resistant electrical coupling to a printed circuit board. More specifically, the invention relates to a fastening device which rigidly secures a printed circuit board having electrically conductive fingers extending from the edge to a circuit board edge connector which electrically couples with the fingers.

Printed circuit boards generally comprise a sheet of insulative material onto which electrically conductive material is deposited. Electrical coupling to the circuit board is provided by a plurality of electrically conductive fingers which extend outward from the edge of the circuit board. The most basic and least expensive type of edge connector is one having a plurality of finger receiving slots defined by electrically conductive contact, and a plurality of outward-extending electrical leads connected to the contacts. This edge connector permits the printed circuit board to be electrically coupled with external electrical devices or circuits. One such type of simple edge connector is TRW Cinch Model 252-22-90-210.

In most cases the electrical leads which extend outward from the back of the edge connector are individually connected to separate electrical wires. However, the electrical leads on the edge connector are also capable of being directly coupled to a second printed circuit board. In such a construction the electrical leads extend through holes in the plane of the second circuit board and are soldered to the printed circuits deposited on the second connector board. The finger receiving slots of the edge connector used in such an electrical circuit construction thus extend normal from the plane of the second circuit board, and are coupled with the fingers of the first circuit board. The result of such a construction is two mutually perpendicular electrically coupled circuit boards.

In order to prevent the edge connector from becoming detached from the circuit board or to prevent mutually perpendicular circuit boards from becoming disconnected, it is desirable to rigidly secure the edge connector to the printed circuit board. This rigid securing is required not only when two circuit boards are connected to one another in the mutually perpendicular fashion, but also when a single circuit board is coupled with a single edge connector. Such securing is required primarily in situations where the circuit boards may be subjected to vibration.

In many applications a printed circuit board is secured to the edge connector only by the spring-like gripping forces applied to the fingers of the circuit board by the electrically conductive contacts which define the slots of the edge connector. In one such application the boards are inserted in a housing or cabinet and aligned in mutually perpendicularly spaced parallel planes with each of the circuit boards having its electrically conductive fingers oriented in the same direction. The edge connectors for the circuit boards are attached to a hinged locking plate which moves the edge connectors into locked engagement with the fingers of the circuit boards. In other applications, each edge connector is simply manually engaged with the conductive fingers of the circuit board.

This latter application has the inherent disadvantage that electrical contact between the circuit and the edge connector is likely to be impaired or lost when the board and edge connector are subjected to mechanical vibration.

There are more elaborate and costly edge connectors available which have gripping means, such as spring clips, for securing the edge connector to the circuit board and thus preventing disruption or loss of electrical contact during vibration. However, there are no commercially available fastening devices which rigidly secure the basic and inexpensive type of edge connector to a single printed circuit board. When such rigid securing is desired, it is often necessary to fabricate a fastening member and to attach the member to the circuit board by a bolt and nut. This practice requires the use of insulative washers since the bolt head and the nut are electrically conductive and would otherwise interfere with the circuits printed on the board. Additionally, the assembly of nuts and bolts on each circuit board is time consuming and thus expensive, especially when a large number of circuit boards and the edge connectors are to be secured.

SUMMARY OF THE INVENTION

The present invention provides a time-saving fastener for rigidly securing an inexpensive edge connector to a printed circuit board, thus making the board and edge connector resistant to vibration and subsequent impairment or loss of electrical contact. The present invention comprises generally a pair of fastening members, each of which has means at one end for retaining the edge connector and means at the other end for attaching the fastening member to the circuit board, and a pair of drive pins operable with the fastening members for rigidly securing the fastening members to the circuit board. The two fastening members are spaced apart on opposite sides of the circuit board fingers and edge connector slots.

The attaching means on each fastening member comprises generally a planar portion having a back surface, a mating surface for contacting the surface of the circuit board near the edge, and an aperture from the back surface to the mating surface. Projecting generally perpendicularly outward from the mating surface and arranged about the aperture are flexible attaching means, e.g. a plurality of flexible ears, which insert through an opening provided in the circuit board, thereby loosely attaching the fastening member to the circuit board and allowing the mating surface of the planar portion to engage and contact the surface of the circuit board.

The retaining means on each fastening member comprises generally an end portion extending outward from the planar portion and overlapping the edge of the circuit board. Means are provided on the end portion for securing the edge connector to the fastening member.

A drive pin which is movable through the aperture in the planar portion of each fastening member expands the attaching means within the opening in the circuit board and thereby rigidly secures the previously loosely attached fastening member to the circuit board. Movement of the drive pin through the aperture in the planar portion of the fastening member so as to expand the attaching means within the opening on the circuit board generates gripping forces between the attaching means and the mating surface and between the attaching means and the overlapping end portion of the fastening member. Thus the fastening member is rigidly secured to the circuit board by the movement of the drive pin through the aperture.

The distance between the overlapping wall of the end portion and the attaching means which project from the mating surface of the planar portion is preselected to accommodate the distance between the opening provided in the circuit board and the edge of the circuit board. Thus the fastening member is only loosely attached to the circuit board when the attaching means are inserted through the opening in the circuit board and the mating surface contacts the surface of the circuit board. The movement of the drive pin so as to expand the attaching means within the opening narrows the distance between the attaching means and the overlapping wall of the end portion so that gripping forces are applied between the overlapping wall and the expanded attaching means in the plane of the circuit board and between the mating surface and the expanded attaching means normal to the circuit board.

The end portion of each fastening member has means for retaining the edge connector to the fastening member. Preferably this retaining means is a threaded steel insert embedded into a cavity in the end portion. A bolt inserted through the edge connector engages the insert on the end portion of the fastening member.

The fastening members are preferably constructed of heat resistant nylon so that portions of the printed circuit board may be soldered after the edge connector has been rigidly secured.

For a fuller understanding of the nature and advantages of the invention, reference should be made to the ensuing detailed description taken in conjunction with the accompanying drawings.

DESCRIPTION OF THE PREFERRED EMBODIMENTS

Figure 1:
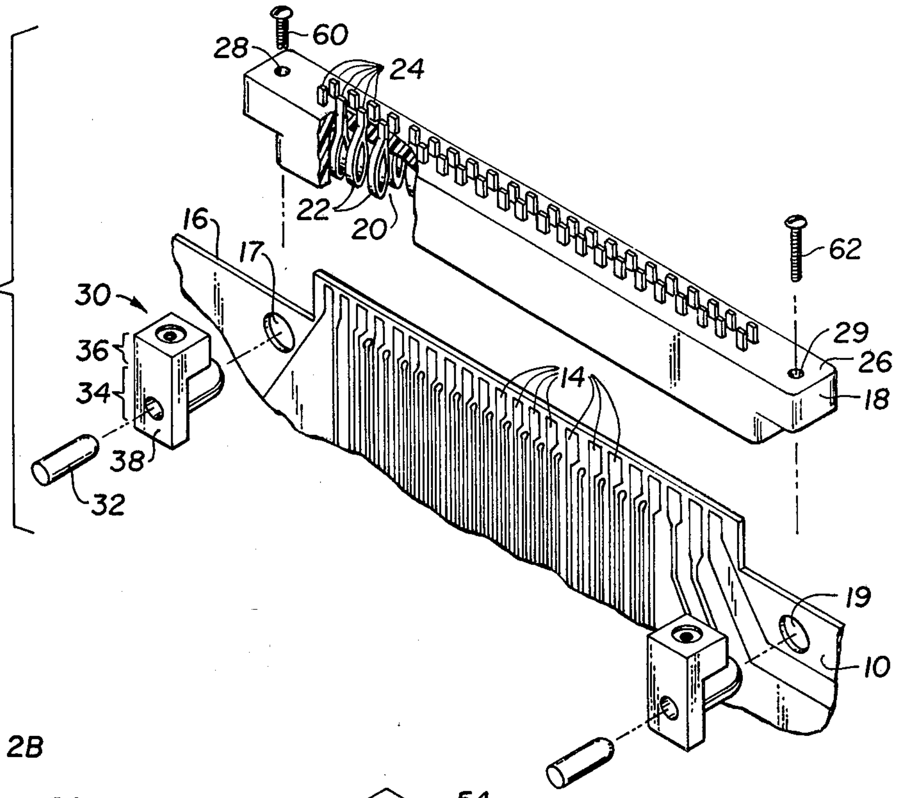
FIG. 1 is an exploded perspective view of a preferred embodiment of the invention showing a printed circuit board, an edge connector, and a pair of fastening members partially broken away.

A typical printed circuit board 10, a portion of which is illustrated in the exploded view of FIG. 1, comprises generally a planar substrate constructed of insulative material and having electrically conductive material deposited thereon to form conductor paths (partially shown). These conductor paths are electrically connected to electrically conductive fingers 14 which are arranged in a side-by-side parallel arrangement and which extend beyond the edge 16 of the board 10. The electrically conductive fingers 14 allow the electrical circuits on the board 10 to be electrically coupled to electrical devices or circuits located external to the board 10. Two openings 17 and 19 through the circuit board 10 are spaced apart on opposite ends of the fingers 14 and are located proximate the edge 16 of the circuit board 10.

An edge connector 18 having a plurality of finger receiving slots 20, provides a connecting interface between the printed circuit board 10 and external electrical devices. Each of the slots 20 is defined by a pair of flexible copper contacts 22 which are spaced apart a distance slightly less than the thickness of the board 10 so that electrical contact is made between each contact 22 and the associated finger 14 when the edge connector 18 engages the outwardly extending fingers 14 of the circuit board 10. Each of the contacts 22 is connected to a lead 24 which protrudes from the back side 26 of the edge connector 18. Each of these leads 24 is capable of electrical connection to external devices or circuits. Provided on opposite ends of the plurality of slots 20 of the edge connector 18 and spaced apart from the slots 20 are two thrubores 28 and 29, whose axes are oriented generally parallel to the fingers 14 when the fingers 14 and slots 20 are in mutual engagement.

Each of the electrical leads 24 extending from the back side 26 of the edge connector 18 is connected, e.g. by soldering to an individual electrically conductive lead (not shown) which in turn is connected to any desired external device or circuit. Alternatively, all of the leads 24 of the edge connector 18 may be inserted through a like number and arrangement of holes in a second circuit board (not shown) with the back side 26 of the edge connector 18 placed in contact with the second circuit board surface, thereby resulting in a circuit arrangement in which the two circuit boards are mutually perpendicular to one another. In such an arrangement, the leads 24 inserted through the holes in the second circuit board are bent over and soldered to portions of the printed circuits on the second circuit board.

The present invention provides a fastening device which rigidly secures the edge connector 18 to a circuit board 10, thereby increasing structural rigidity and ensuring proper electrical contact either when a circuit board 10 is coupled to external devices by an edge connector 18 or when two circuit boards are electrically coupled in a mutually perpendicular arrangement by the edge connector 18.

Referring again to FIG. 1, the fastening device comprises generally a fastening member generally designated by reference numeral 30 and expanding means, e.g., a shaft or drive pin 32, for movement through the fastening member 30 in the manner described below.

Fastening member 30 has generally two portions, a first planar shaped portion 34 for rigidly securing the fastening member 30 to the circuit board 10 and an end portion 36 which overlaps the edge of the circuit board 10 for retaining the edge connector 18 to the fastening member 30.

Figure 2A:
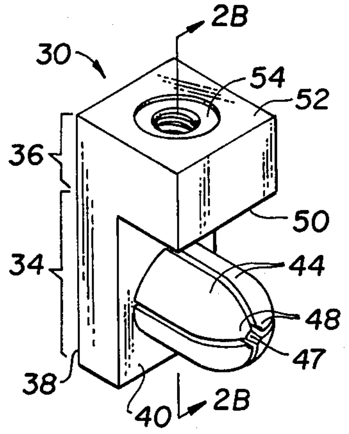
FIG. 2A is an isometric view of the fastening member.
Figure 2B:
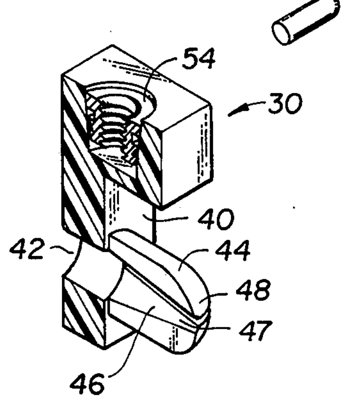
FIG. 2B is a sectional view taken along lines 2B—2B of FIG. 2A.

Referring now to FIGS. 2A and 2B, the planar portion 34 of the fastening member 30 has a back surface 38, a planar mating surface 40 for engagement and contact with a surface of the board 10, and an aperture 42 through the planar portion, extending from the back surface 38 to the mating surface 40. Arranged about the aperture 42, preferably in a circular arrangement, and projecting generally perpendicularly outward from the mating surface 40 are a plurality of flexible ears 44 for insertion through one of the openings 17, 19 on the circuit board 10 for loosely attaching the fastening member 30 to the circuit board 10.

In the preferred embodiment, the openings 17, 19 on the circuit board 10 and the outer periphery of the flexible ears 44 are both circularly shaped. The diameter of the circularly shaped outer periphery of the flexible ears 44 is slightly less than the diameter of the openings 17, 19 on the circuit board 10 so that the fastening member 30 is only loosely attached to the circuit board 10 when the flexible ears 44 are inserted through an opening 17, 19. Each of the flexible ears 44 has a tapered thickness which increases with the distance from the mating surface 40, thereby resulting in each of the flexible ears 44 having an inside face 46 which is angularly inclined from the mating surface 40 toward the axis of aperture 42. Thus, the circular arrangement of the flexible ears 44 about the aperture 42 results in the inside faces 46 of the flexible ears 44 defining a generally conically shaped passage 47 which converges at the tips 48 of the flexible ears 44. Thus, at the mating surface 40, the passage 47 defined by the inside faces 46 of the circularly-arranged flexible ears 44 has a diameter generally equal to that of the aperture 42. Correspondingly, at the tips 48 of the flexible ears 44 the passage 47 has a diameter substantially less than the diameter of the aperture 42.

The end portion 36 of the fastening member 30 has an inner wall 50 generally perpendicular to the mating surface 40 of the planar portion and an outer wall 52 generally parallel to the inner wall 50. The end portion 36 generally defined by parallel inner and outer walls 50 and 52 includes means for retaining the edge connector 18 to the fastening member. Preferably, this retaining means is a threaded insert 54 preferably fabricated from steel which is embedded, e.g. by friction fitting into a cylindrically shaped cavity 56 extending into the end portion 36 from the outer wall 52. Alternatively, the cavity 56 itself may be threaded around its cylindrical wall. The outer wall 52 thus cooperates with the edge connector 18 and specifically with one of the thrubores 28, 29 which are aligned with the cavity 56 in the end portion 36 when the edge connector 18 is properly aligned with respect to the fastening member 30. It should also be noted that inner wall 50 and the closest point on the outside periphery of the flexible ears 44 are separated by a predetermined distance slightly greater than the distance between the edge 16 of the circuit board 10 and the closest point thereto on the circumference of one of the openings 17 or 19.

Figure 3A:
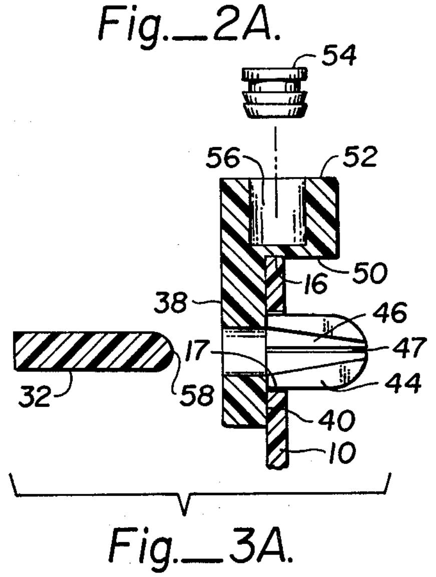
FIG. 3A is a sectional view of the drive pin and the fastening member loosely attached to the circuit board.
Figure 3B:
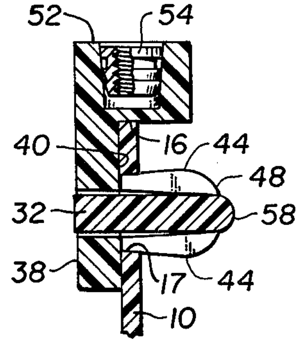
FIG. 3B is a view of the drive pin inserted into the fastening member with the fastening member rigidly secured to the circuit board.

Referring now to FIGS. 3A and 3B, the operation of the fastening device to rigidly secure the edge connector 18 to the circuit board 10 can be understood. The fastening member 30 is loosely attached to the circuit board 10 by insertion of the flexible ears 44 through the opening 17 in the circuit board. In such a loose attachment the mating surface 40 is generally in close engagement with the cooperating surface of the circuit board 10. Similarly, the inner wall 50 and the flexible ears 44 generally straddle the segment of the circuit board 10 defined by the outer edge 16 and the closest point thereto on the circumference of the opening 17.

The drive pin 32 is then moved from the back surface 38 of the planar portion 34 through the aperture 42 and into the passage 47 defined by the inside faces 46 of the plurality of flexible ears 44. Because the inside faces 46 of the flexible ears 44 define a generally converging conically shaped passage 47 and because the conically shaped passage narrows at the tips 48 of the ears 44 to a diameter substantially less than the diameter of the drive pin 32, the nose 58 of the drive pin 32 will experience resistance as it is moved through the passage 47. Application of a continued driving force to the pin 32 spreads the flexible ears 44 apart until the drive pin is fully inserted in the manner as shown in FIG. 3B.

As the drive pin 32 moves through the passage 47 the flexible ears 44 radially expand within the opening 17 in the circuit board 10 and outboard of the opposite surface of board 10. The expansion of the flexible ears 44 generates gripping forces between the flexible ears 44 and the inner wall 50 and between the flexible ears 44 and the mating surface 40, thereby resulting in rigid securing of the fastening member 30 to the circuit board 10. Thus, after the drive pin 32 is fully inserted within the aperture 42 and passage 47, the outer periphery of the flexible ears 44 have a diameter which increases with distance from the mating surface 40. Accordingly, these spread-apart outwardly diverging flexible ears 44 apply two orthogonally oriented gripping forces, one of which is between the mating surface 40 and the flexible ears 44 and the other between the flexible ears 44 and the inner wall 50 of the end portion 36.

Once the fastening member 30 is rigidly secured to the circuit board 10 in the above-described manner the edge connector 18 is then secured to the end portions 36 of the two fastening members 30. Preferably such securing is provided by bolts 60 and 62 which pass through the bores 28 and 29 and engage the threaded inserts 54 embedded in the cavities 56 of the end portions 36.

While preferably a pair of fastening members are used to rigidly secure the edge connector to the circuit board in the above-described manner, it is possible to provide secure attachment with only one fastening member, if desired.

If it is desired to remove the securely attached fastening member 30 from the circuit board 10, the drive pin 32 may be forced out of the passage 47 and aperture 42, thereby allowing the flexible ears 44 to return to their unflexed position and allowing the fastening member 30 to again be only loosely attached to the circuit board 10.

The fastening member 30 and drive pin 32 are preferably constructed of a heat-resistant electrically nonconductive material, e.g., nylon, so that the circuits on the circuit board 10 and leads 24 on the edge connector 18 may be soldered without damaging the fastening device.

As should now be apparent, the present invention allows the use of the least expensive edge connectors. Such inexpensive edge connectors heretofore could not be rigidly secured to a circuit board without fabrication of special fasteners and the use of nuts and bolts to secure those fasteners.

The use of the present fastening device, unlike nut and bolt fasteners, requires access from only one side of the circuit board 10, since the drive pin 32 is inserted only from the back surface 38 of the planar portion 34 of the fastening member 40. This provides for rapid installation of the fastening device thereby saving significant assembly time, especially when large numbers of circuit boards and edge connectors are to be secured. Additionally, because of the orthogonal gripping forces generated by the drive pin 32 inserted through the passage 47 defined by the flexible ears 44, the edge connector 18 and printed circuit board 10 are resistant to vibration and subsequent loss of electrical contact.

While the preferred embodiments of the present invention have been illustrated in detail, it should be apparent that modification and adaptations of those embodiments will occur to those skilled in the art. However, it is to be expressly understood that such modifications and adaptations are within the sphere and scope of the present invention as set forth in the following claims.

What is claimed is:

1. An apparatus for securing a circuit board edge connector to a circuit board, the circuit board having an opening proximate an edge thereof, said apparatus comprising:

a fastening member having a first portion, said first portion having a back surface, a mating surface adapted for engagement with the circuit board, and an aperture extending from said back surface to said mating surface; and an end portion having a wall oriented generally perpendicular to said mating surface;

means on said end portion for enabling said edge connector to be secured to said fastening member;

attaching means projecting from said mating surface of said first portion and insertable through the opening in the circuit board for enabling the fastening member to be loosely attached to the circuit board; and means operable with said attaching means for expanding said attaching means when inserted in the opening so as to enable the previously loosely attached fastening member to be rigidly secured to the circuit board, said wall of said end portion and said attaching means being spaced apart a predetermined distance so that said wall overlaps the circuit board edge when said attaching means is inserted in said opening so that said wall and said attaching means generate orthogonal gripping forces to the circuit board when said attaching means is expanded by said expanding means.

2. Apparatus according to claim 1 wherein said attaching means includes a plurality of flexible ears spaced about said aperture and defining a passage outwardly directed from said mating surface.

3. Apparatus according to claim 2 wherein said flexible ears are integrally constructed with said first portion of said fastening member.

4. Apparatus according to claim 2 wherein said expanding means includes a shaft movable through said aperture and said passage, whereby when said shaft moves through said passage said flexible ears are mutually expanded so as to rigidly secure the fastening member to the circuit board.

5. Apparatus according to claim 4 wherein said shaft is constructed of nylon.

6. Apparatus according to claim 2 wherein said ears are shaped so that said passage has a generally conical shape which converges in a direction outwardly from said mating surface.

7. Apparatus according to claim 1 including a threaded bolt means adapted to be received by said end portion and wherein said enabling means on said end portion comprises threaded means for engaging said bolt.

8. Apparatus according to claim 7 wherein said threaded means comprises an insert embedded in said end portion.

9. Apparatus according to claim 8 wherein said insert is constructed of steel.

10. Apparatus according to claim 1 wherein said fastening member is constructed of nylon.

11. Apparatus according to claim 2 wherein said expanding means further comprises a drive pin insertable through said aperture on said first portion and movable through said passage for spreading said flexible ears apart from one another so as to generate said gripping forces between said flexible ears and said wall and between said flexible ears and said mating surface, thereby generally rigidly securing said fastening member to the circuit board.

12. An improved printed circuit board assembly capable of securing an edge connector to an edge of a circuit board, said improved circuit board assembly comprising in combination:

a printed circuit board having a plurality of electrically conductive fingers extending from an edge thereof and a pair of openings flanking said plurality of fingers, each of said openings being located proximate the edge of the circuit board;

a pair of fastening members, each of said members having a planar portion with a mating surface, a back surface, and an aperture extending from said back surface through said mating surface; and an end portion having an inner wall for overlapping the edge of said circuit board when said mating surface of said planar portion is in contact with said circuit board surface;

means on each of said fastening members projecting from said mating surface proximate said aperture and inserted through one of said openings in the circuit board for loosely attaching the fastening member to the circuit board;

means operable with each of said attaching means for expanding said attaching means within said opening so as to generally rigidly secure the previously loosely attached fastening member to said circuit board; and retaining means on said end portion of each of said fastening members for enabling the edge connector to be secured to the fastening members and therewith to said circuit board.

13. Apparatus according to claim 12 wherein each of said attaching means includes a plurality of flexible ears spaced about said aperture and defining a passage outwardly directed from said mating surface.

14. Apparatus according to claim 13 wherein said flexible ears are integrally constructed with said planar portion of said fastening member.

15. Apparatus according to claim 13 wherein each of said expanding means includes a drive pin movable through said aperture and said passage, whereby when said drive pin moves through said passage said flexible ears are mutually expanded to thereby rigidly secure said fastening member to said circuit board.

16. Apparatus according to claim 15 wherein said drive pin is constructed of nylon.

17. Apparatus according to claim 13 wherein said ears are shaped so that said passage has a conical shape which converges in a direction outwardly from said mating surface.

18. Apparatus according to claim 13 wherein said inner wall and said flexible ears are spaced apart a predetermined distance so that said inner wall overlaps the circuit board edge when said flexible ears are inserted in said opening, whereby said inner wall and said flexible ears generate gripping forces to said circuit board when said movable drive pin is moved through said passage and said flexible ears are expanded.

19. Apparatus according to claim 12 wherein each of said fastening members is constructed of nylon.

20. Apparatus according to claim 12 wherein said retaining means comprises threaded bolt receiving means.

21. Apparatus according to claim 20 wherein said threaded bolt receiving means comprises an insert embedded in said end portion.

22. A device for providing secure electrical and mechanical coupling to a printed circuit board, the device comprising in combination:

a printed circuit board having a plurality of electrically conductive fingers extending from an edge thereof and at least one opening located proximate the edge of said circuit board;

an edge connector having a multiplicity of finger receiving slots;

at least one fastening member, said member having a planar portion with a mating surface, a back surface, an aperture extending from said back surface through said mating surface, a plurality of flexible ears arranged about said aperture and projecting from said mating surface for insertion through an opening in said circuit board, said flexible ears defining a passage having a generally conical shape which converges in a direction outwardly from said mating surface; and an end portion having an inner wall for overlapping the edge of said circuit board when said flexible ears are inserted through an opening on said circuit board and said mating surface of said planar portion is in contact with the surface of said circuit board, said inner wall of said end portion and said flexible ears being spaced apart a predetermined distance;

at least one drive pin, said pin being movable through said aperture and said conically shaped passage of said fastening member for expanding said flexible ears, whereby when said drive pin is moved through said aperture and passage said flexible ears of said fastening member are spread apart to thereby generate gripping forces between said flexible ears and said mating surface and between said flexible ears and said inner wall of said end portion, thereby generally rigidly securing said fastening member to said circuit board; and means operable with said fastening member end portion and said edge connector for retaining said edge connector to said end portion of said fastening member and therewith to said circuit board when said circuit board fingers are inserted into said finger receiving slots of said edge connector.

23. Apparatus according to claim 22 wherein said circuit board has a pair of opening flanking said plurality of electrically conductive fingers, and including a pair of said fastening members and a pair of drive pins.

24. Apparatus according to claim 22 wherein said retaining means comprises threaded bolt means adapted to be received by said end portion and threaded means on said end portion for engaging said bolt means.

25. Apparatus according to claim 24 wherein said threaded means on said end portion comprises an insert embedded in said end portion.

* * * * *